Patented Jan. 20, 1953

2,626,280

UNITED STATES PATENT OFFICE 2,626,280

THIO BIS (BENZENE SULFONYL HYDRAZIDE)

Byron A. Hunter, Oxford, Conn., assignor to United States Rubber Company, New York, N. Y., a corporation of New Jersey No Drawing. Application May 7, 1952, Serial No. 286,610

1 Claim. (Cl. 260—556)

This invention relates to a new and useful organic compound which possesses unique and valuable properties. In particular, the invention involves the discovery that a new chemical compound which can be readily produced from hydrazine and p,p'-thio bis (benzene sulfonyl chloride), the latter intermediate being readily prepared by the reaction of diphenyl sulfide with chlorosulfonic acid, possesses the useful property of being unusually stable under normal storage conditions but upon heating undergoes a moderately rapid decomposition to produce nitrogen gas. This new chemical compound is an outstanding chemical blowing agent for rubber and for organic plastics such as polyvinyl chloride-plasticizer mixtures. Specifically, the invention lies in the discovery of p,p'-thio bis (benzene sulfonyl hydrazide) as a new and unique composition of matter.

The present application is a continuation-in-part of copending application Serial No. 176,084 filed July 26, 1950.

I have found that p,p'-thio bis (benzene sulfonyl hydrazine) is a new composition of matter which exhibits excellent properties as a blowing agent for rubber and organic plastics. This material is very efficient in the production of cellular rubber and plastics and is non-discoloring and non-odorous, both before and after the blowing.

A convenient method for making p,p'-thio bis (benzene sulfonyl hydrazide) is indicated by the following equation:

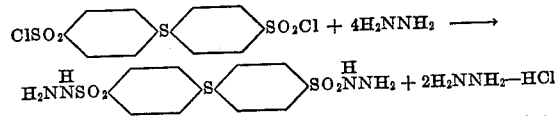

The p,p'-thio bis (benzene sulfonyl chloride) indicated as a starting material in the above reaction can be readily prepared by the following reaction:

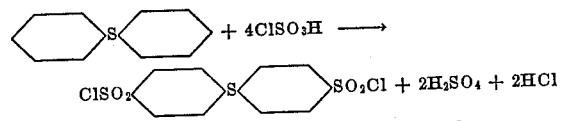

A description of the preparations and properties of these two substances follows:

*Preparation of p,p'-thio bis (benzene sulfonyl chloride)*

Ninety-three grams (0.5 mole) of diphenyl sulfide was placed in a one liter, three-necked flask equipped with a mechanical stirrer, addition funnel and a thermometer. The material was heated to 80° C. and 349.5 grams (3.0 moles) of chlorosulfonic acid was added gradually. An exothermic reaction set in and the heating mantle was removed. The rate of addition of the chlorosulfonic acid was adjusted to keep the temperature between 60 and 80° C. After the addition was complete, the mixture was cooled to 20° C. and stirred at that temperature for an additional two hours. The acid mixture was poured into cold water and the aqueous mixture was then warmed to 80° C. to facilitate filtering. The filtered product was washed with water and then dried at 65° C. The crude material weighed 135 grams (70% yield) and melted at 139–142°. Three recrystallizations from chloroform raised the melting point to 155–156° C. The purified p,p'-thio bis (benzene sulfonyl chloride) was analyzed.

Percent chlorine calculated for $C_{12}H_8O_4S_3Cl_2$------ 18.53%
Found ------------------------------------- 18.72%, 18.79%
Percent sulfur calculated for $C_{12}H_8O_4S_3Cl_2$------ 25.07%
Found ------------------------------------- 24.31%, 24.37%

*Preparation of p,p'-thio bis (benzene sulfonyl hydrazide)*

Sixty-four grams (0.17 mole) of p,p'-thio bis (benzene sulfonyl chloride) M. P. 155–156° C. was suspended in 500 cc. of ethyl alcohol. The mixture was stirred in a water bath as 21.4 grams (0.67 moles) of anhydrous hydrazine was gradually added, keeping the temperature near 20° C. The mixture was stirred for two hours after the addition was complete and was then poured in ice water. The precipitate was filtered off and washed once with water. After drying, the product weighed 58.5 g. (93.6% of theory) and melted with decomposition at 156–159° C. The substance was purified by dissolving in dilute sodium hydroxide solution, filtering the solution from impurities, and making just acid with dilute acetic acid. The reprecipitated material was washed well with water and dried. The purified product melted with decomposition at 163° C. The following analyses show the material to be p,p'-thio bis (benzene sulfonyl hydrazide).

Percent sulfur calculated for $C_{12}H_{14}O_4S_3N_4$-------- 25.67%
Found-------------------------------------- 25.05%, 26.98%
Percent carbon calculated for $C_{12}H_{14}O_4S_3N_4$------ 38.52%
Found-------------------------------------- 38.14%, 38.27%
Percent hydrogen calculated for $C_{12}H_{14}O_4S_3N_4$---- 3.74%
Found-------------------------------------- 3.54%, 3.69%

This material was used with outstanding success as a blowing agent for rubber and for polyvinyl chloride-plasticizer mixtures.

Having thus described my invention, what I claim and desire to protect by Letters Patent is:

As a new chemical compound, p,p'-thio bis (benzene sulfonyl hydrazide).

BYRON A. HUNTER.

REFERENCES CITED

The following references are of record in the file of this patent:

UNITED STATES PATENTS

| Number | Name | Date |
| --- | --- | --- |
| 2,552,065 | Schoene | May 8, 1951 |